United States Patent [19]
Cypher

[11] Patent Number: 6,141,789
[45] Date of Patent: Oct. 31, 2000

[54] TECHNIQUE FOR DETECTING MEMORY PART FAILURES AND SINGLE, DOUBLE, AND TRIPLE BIT ERRORS

[75] Inventor: Robert Cypher, Los Gatos, Calif.

[73] Assignee: Sun Microsystems, Inc., Palo Alto, Calif.

[21] Appl. No.: 09/160,213

[22] Filed: Sep. 24, 1998

[51] Int. Cl.[7] .................................................. H03M 13/00
[52] U.S. Cl. ............................... 714/805; 714/5; 714/767
[58] Field of Search .................................... 714/767, 799, 714/758, 6, 805, 768, 763

[56] References Cited

U.S. PATENT DOCUMENTS

| | | | |
|---|---|---|---|
| 4,589,112 | 5/1986 | Karim | 714/752 |
| 4,995,041 | 2/1991 | Hetherington et al. | 714/763 |
| 5,164,944 | 11/1992 | Benton et al. | 714/763 |

(List continued on next page.)

FOREIGN PATENT DOCUMENTS 2 216 690   10/1989   United Kingdom.

OTHER PUBLICATIONS

"32–Bit–Wide Memory Tolerates Failures," NTIS Tech Notes, Oct. 1990, p. 818.

International Search Report, Application No. PCT/US99/22024, mailed Jan. 21, 2000.

Dell, "A White Paper on the Benefits of Chipkill–Correct ECC for PC Server Main Memory," IBM Microelectronics Division, Nov. 1997, pp. 1–23.

"Parallel Parity," http://bbs–koi.uniinc.msk.ru/tech1/1994/er_cont/block.htm, 1994, 1 pg.

"Modulo–2 Arithmetic," http://bbs–koi.uniinc.msk.ru/tech1/1994/er_cont/modulo.htm, 1994, 1 pg.

"Introduction to Error Control," http://bbs–koi.uniinc.msk.ru/tech1/1994/er_cont/intro.htm, 1994, 1 p.

Barker et al. "ASCII Table," http://www.eng2.uconn.edu/cse/Cour...08W/References/Ref_ASCIITable.html, Feb. 1998, 1 pg.

"Parity & Computing parity," http://bbs–koi.uniinc.msk.ru/tech1/1994/er_cont/parity.htm, 1994, 2 pgs.

"Error Correction with Hamming Codes," http://bbs–koi.uniinc.msk.ru/tech1/1994/er_cont/hamming.htm, 1994, 2 pgs.

Barker et al. "Hamming Code, Background Information," http://www.eng2.uconn.edu/cse/Courses/CSE208W/Hamming/Background.html, Feb. 1998, 3 pgs.

Barker et al., "Hamming Code, Theory," http://www.eng2.uconn.edu/cse/Courses/CSE208W/Hamming/Theory.html, Mar. 1998, 2 pgs.

"NUMA: Delivering the Next Level of Commodity SMP Performance," http://199.245.235.23/newsletters/html/vpoint5.html, 1996, 4 pgs.

(List continued on next page.)

*Primary Examiner*—Albert De Cady
*Assistant Examiner*—Esaw Abraham
*Attorney, Agent, or Firm*—Conley, Rose & Tayon, P.C.; B. Noël Kivlin

[57] ABSTRACT

The bits of a data block are logically partitioned into an array that includes a number of columns equal to a number of memory devices and a number of rows equal to a number of bits of the data block stored in each memory device. Each memory device contributes one bit to each row. In one embodiment, the bits from a memory device are stored in the same column position of all the rows. One check bit is associated with each row. The check bit is computed by taking the parity of the row associated with the check bit and zero or one column. Each column is assigned to at least four check bits. If a check bit has a column assigned to it, then the check bit is generated by computing the parity of the associated row and the column assigned to the check bit. Alternatively, if the check bit does not have a column assigned to it, the check bit is generated by computing the parity of the row assigned to the check bit only. Each column is assigned to at least four check bits and is assigned to an even number of check bits.

30 Claims, 4 Drawing Sheets

U.S. PATENT DOCUMENTS

| | | | |
|---|---|---|---|
| 5,612,965 | 3/1997 | Michaelson | 714/800 |
| 5,666,371 | 9/1997 | Purdham | 714/763 |
| 5,909,541 | 6/1999 | Sampson et al. | 714/6 |
| 6,035,432 | 3/2000 | Jeddeloh | 714/763 |

OTHER PUBLICATIONS

Barker et al. "Generation Definitions," http://www.eng2.uconn.edu/cse/Cour...8W/References/Ref_Definitions.html, Feb. 1998, 3 pgs.

Barker et al. "Hamming Code, Lab Procedure," http://www.eng2.uconn.edu/cse/Courses/CSE208W/Hamming/Procedure.html, Jun. 1998, 3 pgs.

TECHNIQUE FOR DETECTING MEMORY PART FAILURES AND SINGLE, DOUBLE, AND TRIPLE BIT ERRORS

BACKGROUND OF THE INVENTION

1. Field of the Invention

This invention relates to error detection codes, and more particularly, to error detection codes that detect component failures and up to three arbitrary bit errors.

2. Description of the Related Art

Error detection codes are commonly used in electronic systems to detect data errors, such as transmission errors or storage errors. For example, error detection codes may be used to detect errors within data transmitted via a telephone line, a radio transmitter or a compact disc laser. One common use of error detection codes is to detect errors within data that are stored or read from a memory of a computer system. For example, error detection bits, or check bits, may be generated for data prior to storing data to one or more memory devices. When the data are read from the memory device, the check bits may be used to detect errors within the data. Errors may be introduced either due to faulty components or noise within the computer system. Faulty components may include faulty memory devices or faulty data paths between devices within the computer system, such as faulty pins.

Parity checking is a commonly used technique for error detection. A parity bit, or check bit, is added to a group of data bits. The check bit may be asserted depending on the number of asserted data bits within the group of data bits. If even parity is used, the check bit will make the total number of asserted bits, including the data bits and the check bit, equal to an even number. If odd parity if used, the check bit will make the total number of asserted bits, including the data bits and the check bit, an odd number. Parity checking is effective for detecting an odd number of errors. If an even number of errors occurs, however, parity checking will not detect the error.

More complex error detection codes, such as Hamming codes, may be used to detect multiple bit errors. Unfortunately, these more complex error detection codes typically require a significant number of additional bits. It is a common design goal of computer systems to reduce the number of check bits used to detect errors. The check bits increase the amount of data handled by the system, which may increase the number of memory components, data paths and other circuitry. Further, the increased amount of data increases the probability of an error. Although the check bits may make an error detectable, increasing the amount of data within the system increases the probability of an error occurring. For at least the above reasons, it is desirable to decrease the number of check bits for a given level of error detection.

What is desired is an error detection technique that detects multiple bit errors, including even multiple bit errors, with the same number of check bits as parity checking. It is further desirable to detect a component failure in a memory system employing the error detection scheme.

SUMMARY OF THE INVENTION

The problems outlined above are in large part solved by a technique for detecting memory part failures and single, double and triple bit errors in accordance with the present invention. In one embodiment, the bits of a data block are stored in a plurality of memory devices. The bits of the data block are logically partitioned into an array that includes a number of columns equal to a number of memory devices and a number of rows equal to a number of bits of the data block stored in each memory device. For example, a data block with 512 data bits and 64 check bits may be stored in nine memory devices storing 64 bits each. Eight memory devices store data bits and the ninth memory device stores check bits. The data block may be partitioned into an array with 64 rows of nine bits each. Each memory device contributes one bit to each row. In one embodiment, the bits from a memory device are stored in the same column position of all the rows. For example, the bits stored in a first memory device are assigned in a first column position of each row of the data array, bits from a second memory device are assigned to a second column position of each row, etc.

One check bit is associated with each row. These check bits are all located in the same column, which will be referred to as the "check bits column". In one embodiment, the check bit is computed by taking the parity of the row corresponding to the check bit and zero or one column. Each column, other than the check bits column, is assigned to at least four check bits. If a check bit has a column assigned to it, then the check bit is generated by computing the parity of the corresponding row and the column assigned to the check bit. Alternatively, if the check bit does not have a column corresponding to it, the check bit is generated by computing the parity of the row corresponding to the check is bit only. As discussed above, each column other than the check bits column is assigned to at least four check bits. Additionally, in one embodiment, each column is assigned to an even number of check bits. By generating check bits as described above, the check bits are able to detect any memory part failure, and up to three bit errors.

Broadly speaking, the present invention contemplates a method of detecting errors in a data block of a system that includes a plurality of components, the method comprising: assigning the bits of the data block to a plurality of logical groups such that one bit corresponding to a component is assigned to a logical group; wherein a number of logical groups is equal to a number of bits assigned to a component and each logical group includes a plurality of column positions; assigning the bits to one of the plurality of column positions such that bits from a component group are assigned to the same column position in each logical group; and generating a check bit corresponding to a logical group, wherein the check bit identifies the state of bits in the corresponding logical group and a column position assigned to the check bit, wherein bits in a column position are assigned to four or more check bits.

The present invention further contemplates a computer memory system comprising a plurality of memory devices and an error detection circuit. The plurality of memory devices is configured to store a plurality of bits of a data block. Each bit of the data block is stored in one of the plurality of memory devices and the memory devices store a number of bits at least equal to four times a number of memory devices. The error detection circuit is coupled to the memory devices and configured to generate check bits for data stored in the plurality of memory devices. The check bits are also stored in one of the plurality of memory devices. The bits of the data block are assigned to one of a plurality of logical groups that include a plurality of column positions. The bits stored in the same memory device are assigned to the same column position within the logical groups. A check bit identifies the state of bits in a corresponding logical group and zero or one column position assigned to the check bit. Each column, other than the check bits column, is assigned to four or more check bits.

The present invention still further contemplates a method of detecting errors in a data block of a system that includes a plurality of components, the method comprising: assigning bits of the data block to a plurality of logical groups; wherein each logical group includes a plurality of column positions; and generating a check bit corresponding to a logical group, wherein the check bit identifies the state of bits in the corresponding logical group and a column position assigned to the check bit, wherein a column position is assigned to four or more check bits.

The present invention still further contemplates a computer system comprising a processor, a bus, and a memory. The memory comprises a plurality of memory devices and an error detection circuit. The plurality of memory devices is configured to store a plurality of bits of a data block. Each bit of the data block is stored in one of the plurality of memory devices and the memory devices store a number of bits at least equal to four times a number of memory devices. The error detection circuit is coupled to the memory devices and configured to generate check bits for data stored in the plurality of memory devices. The check bits are also stored in one of the plurality of memory devices. The bits of the data block are assigned to one of a plurality of logical groups that include a plurality of column positions. The bits stored in the same memory device are assigned to the same column position within the logical groups. A check bit identifies the state of bits in a corresponding logical group and a column position assigned to the check bit. Each column position is assigned to four or more check bits.

BRIEF DESCRIPTION OF THE DRAWINGS

Other objects and advantages of the invention will become apparent upon reading the following detailed description and upon reference to the accompanying drawings in which.

Figure 1:
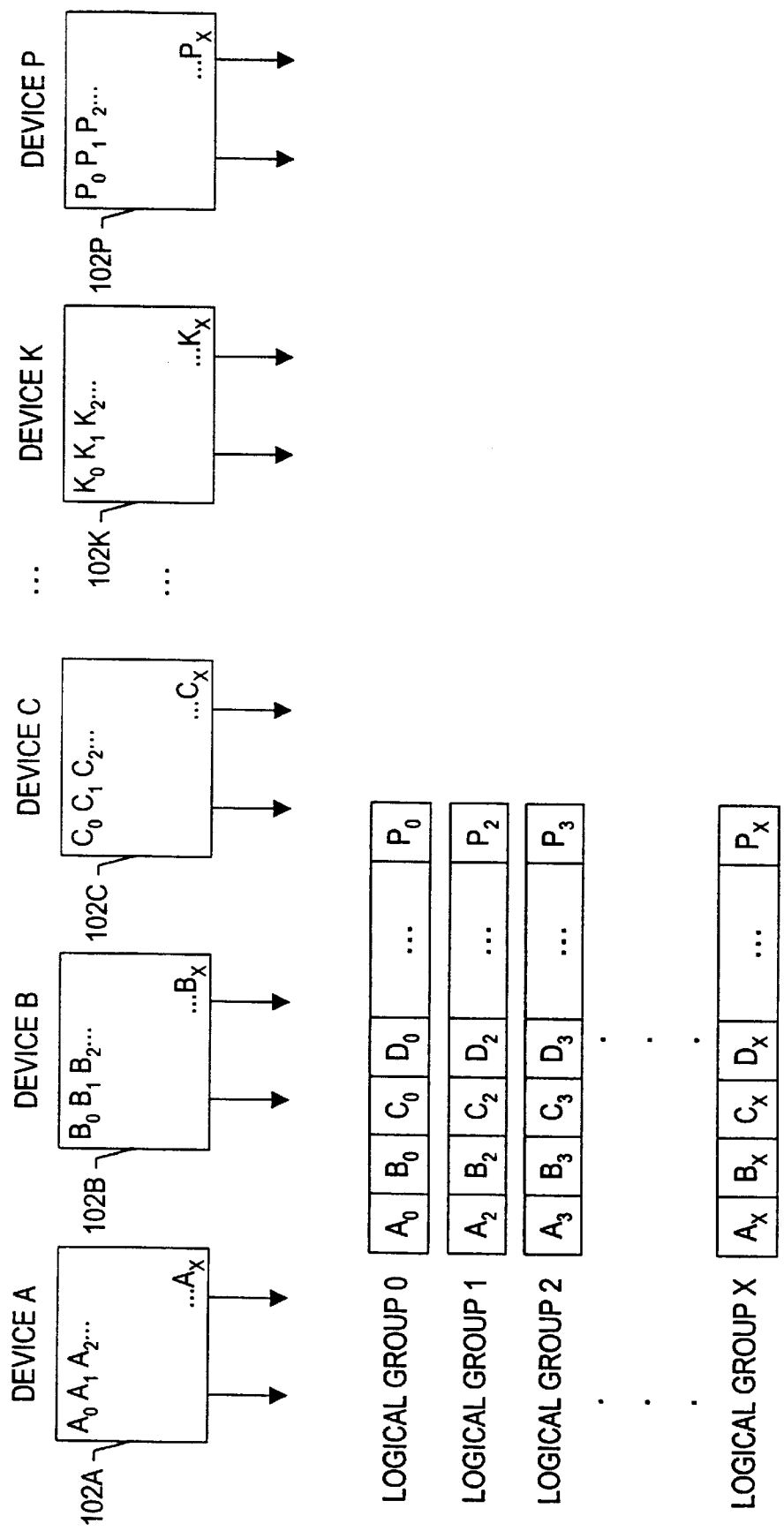
FIG. 1 is a diagram that illustrates the allocation of bits of a data block to logical groups that include a check bit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, the allocation of bits of a data block to a plurality of logical groups that include a check bit is shown. In the illustrated embodiment, a memory system includes memory devices labeled 102A–102P. It is noted that the number of memory devices is a variable that may represent any number. Elements referred to herein with a particular reference numeral followed by a letter may be collectively referred to by the reference number alone. For example, memory devices 102A–102P may be collectively referred to as memory devices 102. Each memory device stores a plurality of bits of a data block. For example, memory device 102A stores bits A0–AX, device 102B stores data bits B0–BX, etc. It is noted that the bits of a data block may be data bits or check bits. Bits stored in a particular memory device are referred to as "corresponding" to that device. Further, bits transferred on a particular data path are referred to as "corresponding" to that data path. Generally speaking, components refer to devices and other parts of a computer system. For example, components may refer to memory devices, pins, data paths, connectors, etc.

The bits within the memory system are allocated to a plurality of logical groups. To prevent one component failure from contributing multiple bits errors to more than one logical group, the bits from components are allocated to logical groups in a manner such that only one bit corresponding to a component is allocated to a logical group. For example, only one bit stored in memory device 102A may be allocated to a logical group.

In the illustrated embodiment, one bit from each memory device is allocated to a logical group. Accordingly, the number of bits in a logical group is equal to the number of memory devices 102. Memory device 102P stores a plurality of check bits and the remaining memory devices store data bits. The check bits are generated prior to storing data to memory devices 102. After the data are read from memory devices 102, the check bits are used to determine whether the state of any of the data bits changed (i.e., are erroneous). The detection of erroneous data bits is referred to as error detection.

In one particular embodiment, the bits of a memory device are allocated to the same column position of each logical group. For example, the data bits stored in memory device 102A (A0–AX) may be assigned to column 0 of the logical groups. Similarly, the data bits stored in memory device 102B (B0–BX) may be assigned to column 1 of the logical groups. As can be seen in FIG. 1, the data block is logically partitioned in an array that includes a number of columns equal to the number of memory devices and a number of rows equal to the number of data bits of a data block stored in a memory device. Each logical group comprises one row of the data array. It should be noted that although check bits represented by $P_0$–$P_X$ may be a part of the data block, they are different than the rest of the bits since they are generated based on the rest of the bits.

Figure 2:
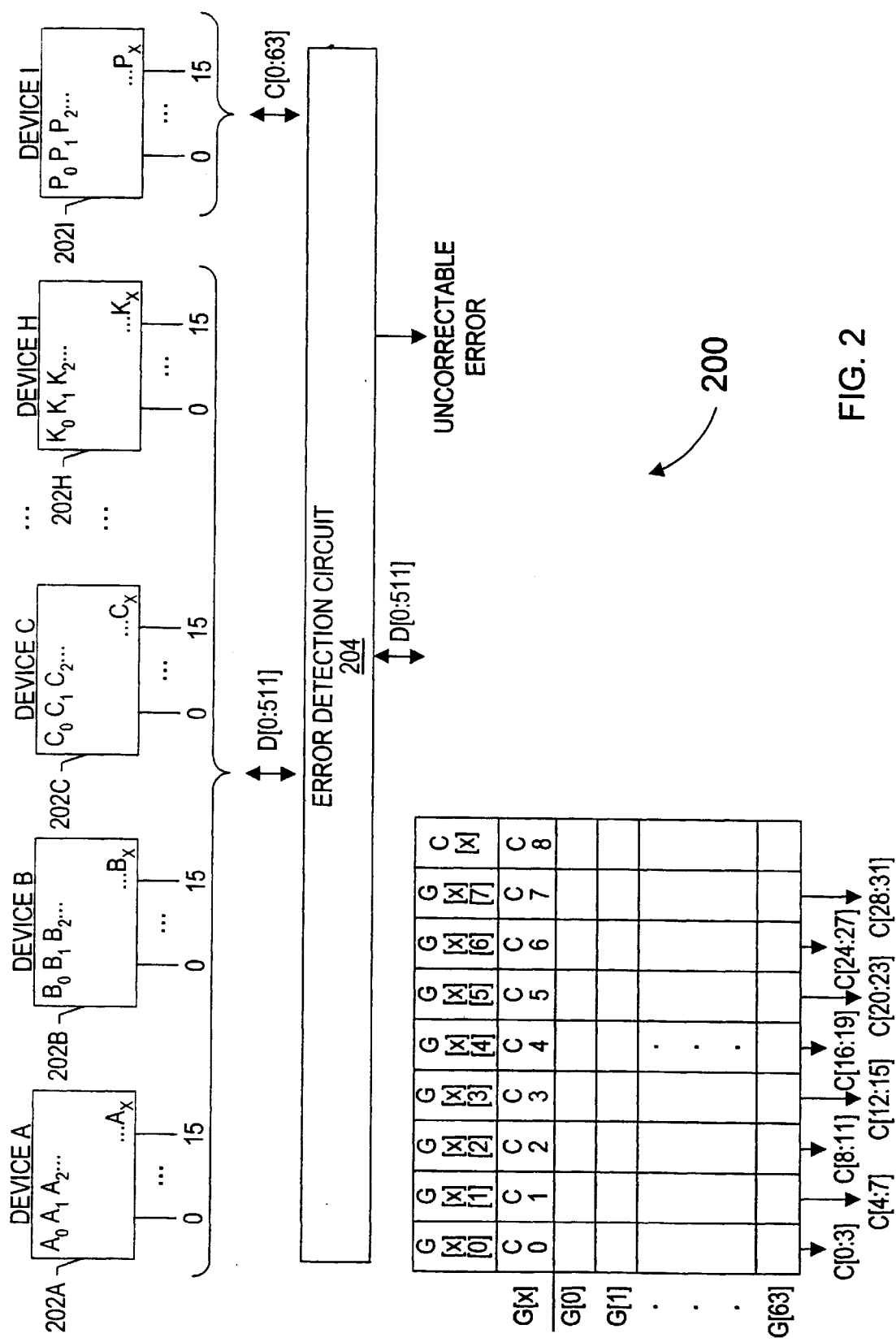
FIG. 2 is a block diagram of a computer memory system that implements an improved technique for computing check bits that increases the error detection capability of the computer memory system.

Turning now to FIG. 2, a block diagram of a computer memory system that detects memory part failures, and single, double, and triple bit errors is shown. Computer memory system 200 includes memory devices 202A–202I and error detection circuit 204. In the illustrated embodiment, memory devices 202A–202H store data bits and memory device 202I stores check bits corresponding to the data bits. In one particular embodiment, memory system 200 performs error detection on data blocks of 512 data bits each. In this embodiment, one check bit is generated for each eight bits of data. Accordingly, 64 check bits are generated for the 512 data bits.

Generally speaking, error detection circuit 204 receives a plurality of data bits. Error detection circuit 204 generates a plurality of check bits corresponding to the data bits and stores the data and check bits to memory devices 202. When the data are read from memory devices 202, error detection circuit 204 verifies the integrity of the data bits using the check bits. For example, error detection circuit 204 may regenerate the check bits and compare the regenerated check bits to the stored check bits. If any errors, within the class of error covered by the error detection code (i.e., up to three bit errors or a component failure) occur, the state of one or more check bits will change. If error detection circuit 204 does not detect any errors, it outputs the data to the system. Alternatively, if error detection circuit 204 detects one or more errors, it outputs an uncorrectable error signal. Further alternatively, if error detection circuit 204 detects one or more errors within the class of errors, the circuit may initiate a process to re-read or re-write the bits of all or specific memory device. Thus, an operation on all or portion of the bits in the data block may be initiated or asserted upon the detection of an error by the error detection circuit 204.

The data bits of computer memory system 200 are partitioned into a plurality of logical groups. Each logical group includes one bit from each of the memory devices that store data bits (namely 202A–202H). Additionally, each logical group includes a check bit. In one embodiment, the check bit is a parity bit. In one particular embodiment, the check bit is an even parity bit.

Each logical group includes a plurality of bit positions. Each bit position corresponds to a memory device. For example, the bits of memory device 202A may be allocated to bit position zero of each logical group. Accordingly, one bit stored in memory device 202A is assigned to bit position zero of logical group zero, another bit is assigned to bit position zero of logical group one, another bit is assigned to bit position zero of logical group two, etc.

Computer system 200 illustrates one embodiment of the present invention. It is noted that other embodiments with differing numbers of data bits, check bits, memory devices and logical groups are contemplated. In the illustrated embodiment, the data block size is 576 bits (512 data bits and 64 check bits). The data block is partitioned into 64 logical groups that each include eight data bits and one check bit. As discussed above, in one embodiment, each data bit of a logical group is stored in a unique memory device. Accordingly, computer system 200 includes eight memory devices (202A–202H) for storing data bits and a ninth memory device (202I) for storing check bits. Each memory device 202 stores 64 bits of the data block. As discussed above, each bit stored in the same memory device is assigned to the same bit position within the 64 logical groups. For example, one of the 64 bits stored in memory device 202A is assigned to each bit position zero of the 64 logical groups.

As shown in FIG. 2, the data block may be organized into an array of data with each logical group forming a row of the array and the data stored in each memory device forming a column of the array. For example, column zero is assigned the data stored in memory device 202A, column one is assigned the data stored in memory device 202B, etc. The data assigned to column eight are the check bits generated by error detection circuit 204 and stored in memory device 202I. The array includes 64 rows of nine bits each. Each row, or logical group, includes one bit from each memory device.

The check bits are computed from the data bits in the row corresponding to the check bits and possibly the data bits in one of the columns of the array (i.e., the data bits stored in a memory device). If the data bits in a column are used in the generation of the check bit for a row, the column is referred as being "assigned to the check bit."

The data bits of each column of the array (excluding the check bits column) are assigned to four or more check bits of the array. It is noted that, in one embodiment, each column is assigned to an even number of check bits in the check bit column. In one embodiment, the check bits are the even parity of the data bits in the row corresponding to the check bits and a column, if one is assigned to the check bit. Therefore, the check bit column is different than other columns since each check bit in the check bit column is generated from the bits in the corresponding row of the array and possibly the bits in a corresponding column in the array. For example, check bit C[0] may be the even parity of data bits G[0][0:7] and the data bits of column C0. Check bit C[1] may be the even parity of data bits G[1][0:7] and the data bits of column C0. Check bit C[2] may be the even parity of data bits G[2][0:7] and the data bits of column C0. Check bit C[3] may be the even parity of data bits G[3][0:7] and the data bits of column C0. In a similar manner check bits C[4:7] may be the even parity of the data bits of the row corresponding to each check bit and the data bits of column C1. Check bits C[8:11] may be the even parity of the data bits of the row corresponding to each check bit and the data bits of column C2, etc. In FIG. 2, one example of the assignment of columns to check bits is shown. The check bits to which a column is assigned are indicated below the column in the illustrated data array.

Since each column, other than the check bits column, is assigned to at least four check bits, the number of rows in the array must be at least four times the number of columns. In other words, the number of bits stored in each memory device must be at least four times the number of memory devices. If the number of rows is greater than four times the number of check bits, then some check bits may not have a column assigned to them. Alternatively, a column may be assigned to more than four check bits. As discussed above, however, in one embodiment, each column is assigned to an even number of check bits.

To demonstrate the error detection capabilities of computer memory system 200, five cases are discussed below. It is noted that the class of errors covered by the error detection code is the detection of one, two, and three bit errors and a memory device failure. Errors of four bits or more in more than one device may create undetectable errors and are not considered in the discussion below. The check bits may be affected by an erroneous bit in two ways. First, a check bit may be affected by the column (assigned to the check bit) contribution to the check bit. Second, the check bit may be affected by the row (assigned to the check bit) contribution to the check bit. It is possible that the row and column contributions may negate the effect of an erroneous bit on the check bit. For example, if data bit G[0][0] is erroneous, check bit C[0] would not change state in this example because column C0 is assigned to check bit C[0]. Accordingly, data bit G[0][0] appears twice in the parity calculation of check bits C[0]. For the above reason, the data bits included in both a row and column of a check bit may be excluded from the calculation of the check bit. It should be noted that the column assignments to the check bits are from the array's columns other than the check bits column.

In a first case, assume there is a total of one, two, or three bit errors that occur in the array, and there is a column X in the array, such that the column X contains an odd number of the errors and column X is not the check bits column. For example, for a total of three errors within the array, one error may occur in the column X and two errors in one or two other columns, or three errors may occur in the column X. For a total of two errors, one error may occur in the column X and the other error within another column. For a total of one error within the array, that error is within the column X. Since column X contains an odd number of erroneous bits and column X is assigned to at least four check bits in the above embodiment, column X must give a column contribution to at least four check bits. However, at most three check bits may be affected with row contributions because at most three erroneous bits may exist within the array. Therefore, at least one check bit will be changed. For example, in a particular case where three bits errors exist and they are located in a single column, assume data bits G[0][0], G[1][0] and G[2][0] change state. The odd number of erroneous bits within the column will affect the check bits to which column C0 is assigned. In the above example, check bits C[0:3] are affected by the column contribution of the erroneous bits. The effect of the erroneous bits on check bits C[0:2] is negated, however, by the row contribution of the erroneous bits in those three rows. This leaves check bit C[3 ] in a changed state.

In a second case, assume there is a total of one, two or three bit errors that occur in the array and that every column other than the check bits column contains an even number of errors. For example, for a total of three errors within the array, two errors may occur within a first column and the other error may occur within the check bits column. Since only even errors exist in every column other than the check bits column, there is no column contribution to any of the check bits. However, at least one check bit is modified due to the row contribution of the erroneous bits. Accordingly, in this case, at least one check bit will be asserted or chance state.

In a third case, a memory chip failure is considered. In this case, assume that all erroneous bits are located within any one column in the array, other than the check bits column, and the total number of errors is odd. Since every column within the array, excluding the check bits column, is assigned to an even number of check bits (in one embodiment four check bits), the column contribution to the check bits will affect an even number of check bits. However, there will be an odd number of check bits affected by row contributions since the total number of erroneous bits is odd. Therefore, at least one of the check bits will be changed.

In a fourth case, assume that all errors occur within any one column in the array, other than the check bits column, and this column contains a non-zero even number of erroneous bits. Since the number of erroneous bits is even, there is no column contribution to any of the check bits. However, there are non-zero number of row contributions and, therefore, at least one of the check bits will be changed.

In a fifth case, errors within the check bits column are considered. In this case, errors may be introduced by a faulty component corresponding to one or more bit positions in the check bits column. Assume that all erroneous bits are within the check bits column, and that there is at least one error. In this case, there is no column contribution to any of the check bits because only columns other than the check bits column are assigned to check bits and all the erroneous bits are within the check bits column. However, there is at least one row contribution; therefore, at least one check bit within the check bits column will be changed.

Figure 3:
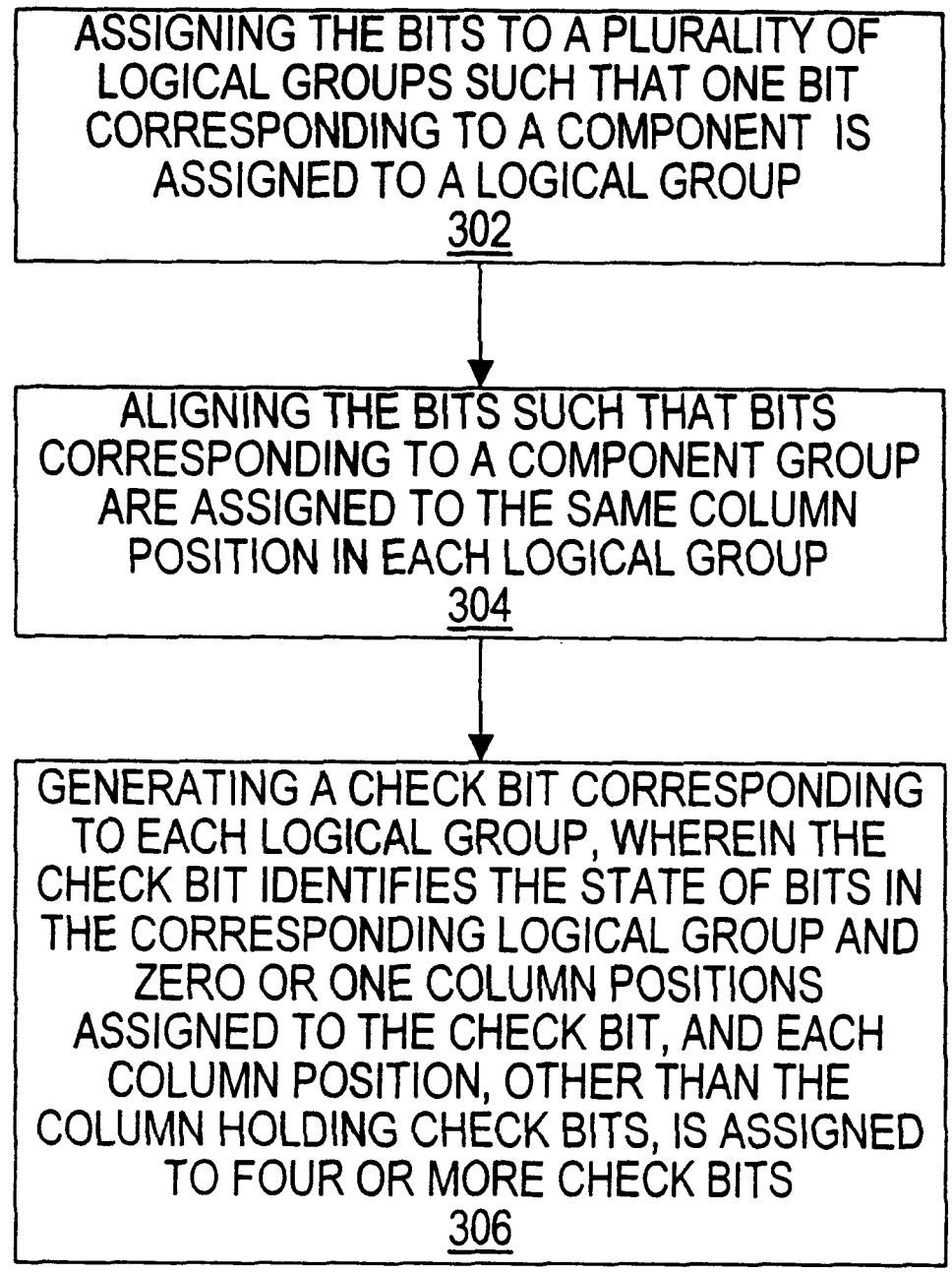
FIG. 3 is a flowchart diagram of a method of computing check bits to increase error detection capability.

Turning now to FIG. 3, a flowchart diagram of a method for detecting memory part failures and single, double, and triple bit errors according to one embodiment of the present invention is shown. In step 302, the bits of the data block are assigned to a plurality of logical groups such that one bit from a component group is assigned to a logical group. For example, one bit stored in a memory device may be assigned to each logical group. In one embodiment, each logical group includes a plurality of column positions.

In step 304, the bits are assigned to logical groups such that bits from a component are assigned to the same column position in each logical group. For example, a first bit stored in a memory device may be assigned to column position zero of logical group zero, a second bit stored in that memory device may be assigned to column position zero of logical group one, a third bit stored in that memory device may be assigned to column position zero of logical group two, etc. In step 306, a check bit corresponding to each logical group is generated. The check bit identifies the state of the bits in the corresponding logical group and zero or one column positions assigned to the check bit. In one embodiment, the check bit is a parity bit for the bits corresponding to the check bit. Each of the plurality of column positions other than the check bits column is assigned to four or more check bits. In an embodiment in which the check bit is a parity bit, the parity bit is the parity of the bits in the row corresponding to the check bit and the bits in the column, if any, assigned to the check bit. As noted above, some check bits may not be assigned a column, but each column other than the check bits column is assigned to four or more check bits. In one embodiment, each column position is assigned to an even number of check bits.

Figure 4:
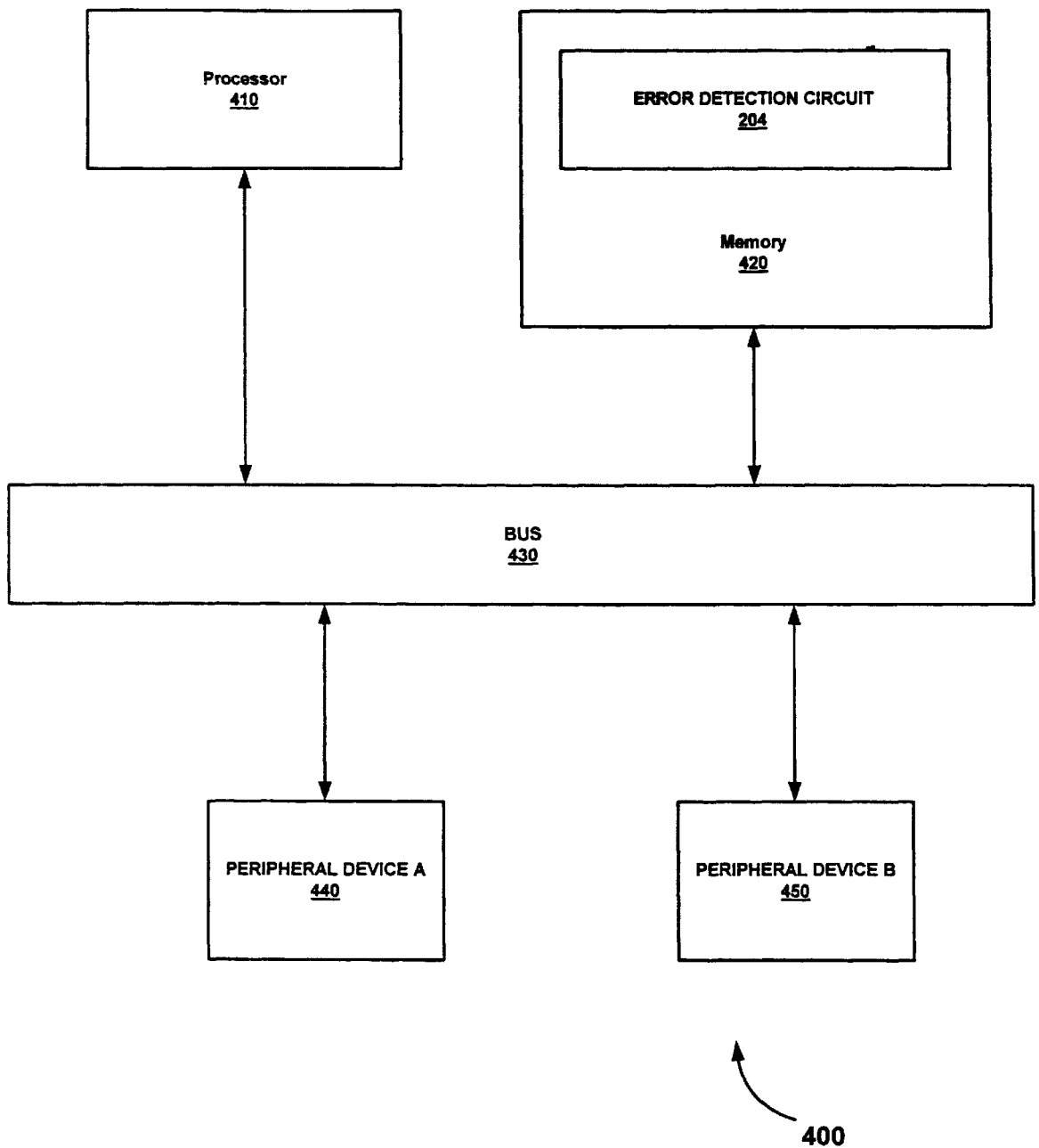
FIG. 4 is a block diagram of a computer system that implements an improved technique for computing check bits that increases the error detection capability of the memory.

Turning now to FIG. 4, a block diagram of a computer system that implements an improved technique for computing check bits that increases the error detection capability of the memory. Computer system 400 includes an error detection circuit 204 shown within memory 420. Instructions executed in processor 410 control data movements between processor 410 and memory 420 and between peripheral devices 440 and 450 and memory 420 through bus 430. It should be noted that the number of buses, processors, and peripheral deices may vary within system 400. Error detection unit 204 may be included within memory 420 or outside memory 420, such as in processor 410, bus 430, within a peripheral device, or the combination of such elements of the system. Furthermore, more than one error detection circuit 204 may be used in the computer system 400 or other systems where data movements exist or needed.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A memory system comprising:
   a plurality of memory devices configured to store a plurality of bits of a data block, wherein each bit of said data block is stored in one of said plurality of memory devices and said plurality of memory devices store a number of bits that is at least equal to four times a number of said plurality memory devices; and
   an error detection unit coupled to said plurality of memory devices and configured to generate a plurality of check bits for data stored in said plurality of memory devices, wherein said plurality of check bits is stored in one of said plurality of memory devices,
   wherein a number of bits of said data block is stored in a first memory device of said plurality of memory devices, said bits stored in said first memory device are assigned into a plurality of logical groups, wherein each logical group of said plurality of logical groups includes a plurality of column positions, and wherein said bits stored in said first memory device are assigned to a same column position within said logical groups, wherein a check bit is used to identify a state of bits in a corresponding logical group of said plurality of logical groups and bits in the same column position within said logical groups, wherein bits in said corresponding logical groups and bits in said same column position within said logical groups are assigned to said check bit, and wherein bits in same column positions, other than a column containing check bits, are assigned to at least four check bits.

2. The memory system as recited in claim 1 wherein said error detection unit is further configured to regenerate said check bits when said data block is read from said memory devices, and reports an error if one or more of said check bits change state.

3. The memory system as recited in claim 2 wherein said error detection unit is further configured to initiate said read from said memory device upon detection of said error.

4. The memory system as recited in claim 1 wherein said check bit is a parity bit for bits of said corresponding logical group of said plurality of logical groups and bits in said same column position (if any) within said logical groups assigned to said check bit.

5. The memory system as recited in claim 1 wherein a number of bits in a logical group of said logical groups equal a number of said memory devices.

6. The memory system as recited in claim 1 wherein bits in first column positions within said logical groups are assigned to at least four check bits.

7. A system for moving and storing data comprising:
a processor;
a memory coupled to said processor, wherein a plurality of memory devices is configured to store a plurality of bits of a data block, and wherein each bit of said data block is stored in one of said plurality of memory devices and said plurality of memory devices store a number of bits that is at least equal to four times a number of said plurality memory devices; and
an error detection unit coupled to said plurality of memory devices and configured to generate a plurality of check bits for data stored in said plurality of memory devices, wherein said plurality of check bits is stored in one of said plurality of memory devices,
wherein a number of bits of said data block is stored in a first memory device of said plurality of memory devices, said bits stored in said first memory device are assigned into a plurality of logical groups, wherein each logical group of said plurality of logical groups includes a plurality of column positions, and wherein said bits stored in said first memory device are assigned to a same column position within said logical groups,
wherein a check bit is used to identify a state of bits in a corresponding logical group of said plurality of logical groups and bits in the same column position within said logical groups, wherein bits in said corresponding logical groups and bits in said same column position within said logical groups are assigned to said check bit, and wherein bits in same column positions, other than a column containing check bits, are assigned to at least four check bits.

8. The system as recited in claim 7 wherein said error detection unit is further configured to regenerate said check bits when said data block is read from said memory devices, wherein said error detection unit is configured either to report an error if one or more of said check bits change state or to initiate re-operation on at least a first plurality of bits of said data block upon detection of said error.

9. The system as recited in claim 7 wherein said check bit is a parity bit for bits of said corresponding logical group of said plurality of logical groups and bits in said same column position within said logical groups assigned to said check bit, wherein bits in said same column position within said logical groups are assigned to at least four check bits.

10. The system as recited in claim 7 wherein a number of bits in a logical group of said logical groups equal a number of said memory devices.

11. A method of detecting errors in a data block of a system that includes a plurality of components, said method comprising:
assigning bits of said data block to a plurality of logical groups such that a first bit of said bits corresponding to a first component of said plurality of components is assigned to a first logical group of said plurality of logical groups, wherein a number of logical groups is equal to a first number of said bits assigned to said first component, and wherein each group of said plurality of logical groups includes a plurality of column positions;
assigning said bits to said plurality of column positions such that bits from each components of said plurality of components are assigned to a same column position in said plurality of logical groups; and
generating an original check bit corresponding to each group of said logical groups, wherein said original check bit identifies a state of bits assigned to a corresponding group of said logical group and bits assigned to the same column positions of said logical groups assigned to said original check bit, wherein said bits assigned to said same column positions of said logical groups are assigned to at least four original check bits.

12. The method as recited in claim 11 further comprising regenerating a check bit corresponding to said original check bit, wherein if regenerated said check bit is different from said original check bit, one or more errors are detected in said data block.

13. The method as recited in claim 12 wherein said original check bit is a parity bit for bits assigned to said corresponding group of said logical groups and bits assigned to said same column positions of said logical groups assigned to said original check bit.

14. The method as recited in claim 11 wherein said components are memory devices, wherein one bit from each memory device is assigned to a logical group, and all bits from a memory device are assigned to a same column positions of said logical groups.

15. The method as recited in claim 14 wherein a number of bits in a logical group of said logical groups corresponds to a number of said memory devices, said original check bit is generated for each logical group, wherein each memory device of said memory devices stores a number of bits equal to four times said number of said memory devices and wherein each said original check bit is assigned to a plurality of bits in the same column position of said plurality of column positions.

16. A method of detecting errors in a data block of a system that includes a plurality of components, said method comprising:
assigning bits of said data block to a plurality of logical groups, wherein each logical group of said plurality of logical groups includes a plurality of column positions; and generating an original check bit assigned to a corresponding logical group of said plurality of logical groups, wherein said original check bit is assigned to a first plurality and a second plurality of bits of said data block, wherein said first plurality of bits are bits in all positions of said plurality of column positions in said corresponding logical group of said logical groups, and said second plurality of bits are bits within the same column positions of said plurality of column positions within said plurality of logical groups, wherein said original check bit identifies a state of bits in said corresponding logical group and said same column positions assigned to said original check bit, wherein said bits in said same column positions are assigned to at least four said original check bits.

17. The method as recited in claim 16 further comprising regenerating a check bit corresponding to said corresponding logical group of said plurality of logical groups, wherein if regenerated said check bit differs from said original check bit assigned to said corresponding logical group, one or more errors are detected in said data block.

18. The method as recited in claim 16 wherein said original check bit is a parity bit for bits in said first plurality and said second plurality of bits of said data block.

19. The method as recited in claim 18 wherein if regenerated said check bit differs from said original check bit assigned to said corresponding logical group, a read or a write operation on either all or portion of bits of said data block is initiated.

20. The method as recited in claim 16 wherein a number of bits in a logical group of said logical groups corresponds to a number of memory devices of said system, a check bit is generated for each logical group, and each memory device stores a number of bits of said data block equal to at least four times said number of memory devices.

21. An apparatus for detecting errors in a data block of a system that includes a plurality of components, said method comprising:

means for assigning bits of said data block to a plurality of logical groups such that a first bit of said bits corresponding to a first component of said plurality of components is assigned to a first logical group of said plurality of logical groups, wherein a number of logical groups is equal to a first number of said bits assigned to said first component, and wherein each group of said plurality of logical groups includes a plurality of column positions;

means for assigning said bits to said plurality of column positions such that bits from each components of said plurality of components are assigned to a same column position in said plurality of logical groups; and means for generating an original check bit corresponding to each group of said logical groups, wherein said original check bit identifies a state of bits assigned to a corresponding group of said logical group and bits assigned to the same column positions of said logical groups assigned to said original check bit, wherein said bits assigned to said same column positions of said logical groups are assigned to at least four original check bits.

22. The apparatus as recited in claim 21 further comprising regenerating a check bit corresponding to said original check bit, wherein if regenerated said check bit is different from said original check bit, one or more errors are detected in said data block.

23. The apparatus as recited in claim 22 wherein said original check bit is a parity bit for bits assigned to said corresponding group of said logical groups and bits assigned to said same column positions of said logical groups assigned to said original check bit.

24. The apparatus as recited in claim 21 wherein said components are memory devices, wherein one bit from each memory device is assigned to a logical group, and all bits from a memory device are assigned to a same column positions of said logical groups.

25. The apparatus as recited in claim 24 wherein a number of bits in a logical group of said logical groups corresponds to a number of said memory devices, said original check bit is generated for each logical group, wherein each memory device of said memory devices stores a number of bits equal to four times said number of said memory devices and wherein each said original check bit is assigned to a plurality of bits in the same column position of said plurality of column positions.

26. An apparatus for detecting errors in a data block of a system that includes a plurality of components, said apparatus comprising:

means for assigning bits of said data block to a plurality of logical groups, wherein each logical group of said plurality of logical groups includes a plurality of column positions; and means for generating an original check bit assigned to a corresponding logical group of said plurality of logical groups, wherein said original check bit is assigned to a first plurality and a second plurality of bits of said data block, wherein said first plurality of bits are bits in all positions of said plurality of column positions in said corresponding logical group of said logical groups, and said second plurality of bits are bits within the same column positions of said plurality of column positions within said plurality of logical groups, wherein said original check bit identifies a state of bits in said corresponding logical group and said same column positions assigned to said original check bit, wherein said bits in said same column positions are assigned to at least four said original check bits.

27. The apparatus as recited in claim 26 further comprising regenerating a check bit corresponding to said corresponding logical group of said plurality of logical groups, wherein if regenerated said check bit differs from said original check bit assigned to said corresponding logical group, one or more errors are detected in said data block.

28. The apparatus as recited in claim 26 wherein said original check bit is a parity bit for bits in said first plurality and said second plurality of bits of said data block.

29. The apparatus as recited in claim 28 wherein if regenerated said check bit differs from said original check bit assigned to said corresponding logical group, a read or a write operation on either all or portion of bits of said data block is initiated.

30. The apparatus as recited in claim 26 wherein a number of bits in a logical group of said logical groups corresponds to a number of memory devices of said system, a check bit is generated for each logical group, and each memory device stores a number of bits of said data block equal to at least four times said number of memory devices.

* * * * *